(12) United States Patent
Bhattacharyya et al.

(10) Patent No.: US 9,996,942 B2
(45) Date of Patent: *Jun. 12, 2018

(54) SUB-PIXEL ALIGNMENT OF INSPECTION TO DESIGN

(71) Applicant: KLA-Tencor Corporation, Milpitas, CA (US)

(72) Inventors: Santosh Bhattacharyya, San Jose, CA (US); Pavan Kumar, San Jose, CA (US); Lisheng Gao, Morgan Hill, CA (US); Thirupurasundari Jayaraman, Chennai (IN); Raghav Babulnath, San Jose, CA (US); Srikanth Kandukuri, Hyderabad (IN); Gangadharan Sivaraman, Chennai (IN); Karthikeyan Subramanian, Chennai (IN); Raghavan Konuru, Andhra Pradesh (IN); Rahul Lakhawat, Chennai (IN)

(73) Assignee: KLA-Tencor Corp., Milpitas, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 15/073,617

(22) Filed: Mar. 17, 2016

(65) Prior Publication Data

US 2016/0275672 A1 Sep. 22, 2016

Related U.S. Application Data

(60) Provisional application No. 62/135,554, filed on Mar. 19, 2015, provisional application No. 62/204,332, filed on Aug. 12, 2015.

(30) Foreign Application Priority Data

Jun. 19, 2015 (IN) .......................... 3081/CHE/2015

(51) Int. Cl.
*G06K 9/00* (2006.01)
*G06T 7/33* (2017.01)

(52) U.S. Cl.
CPC ...... *G06T 7/33* (2017.01); *G06T 2207/10061* (2013.01); *G06T 2207/30148* (2013.01)

(58) Field of Classification Search
CPC ..... G06T 7/0006; G06T 7/0024; G06T 7/001; G06T 7/0004; G06T 2207/30148;
(Continued)

(56) References Cited

U.S. PATENT DOCUMENTS 7,304,302 B1 * 12/2007 Nunan .................... H01J 37/20
250/306
7,394,067 B1 * 7/2008 Soltz ........................ G03F 1/84
118/719

(Continued)

OTHER PUBLICATIONS

International Search Report for PCT/US2016/023318 dated Jun. 24, 2016.
Written Opinion for PCT/US2016/023318 dated Jun. 24, 2016.

*Primary Examiner* — Amir Alavi
(74) *Attorney, Agent, or Firm* — Ann Marie Mewherter

(57) ABSTRACT

Methods and systems for determining a position of output generated by an inspection subsystem in design data space are provided. In general, some embodiments described herein are configured for substantially accurately aligning inspection subsystem output generated for a specimen to a design for the specimen despite deformation of the design in the inspection subsystem output. In addition, some embodiments are configured for generating and/or using alignment targets that can be shared across multiple specimens of the same layer and design rule for alignment of inspection subsystem output generated for a specimen to a design for the specimen.

22 Claims, 7 Drawing Sheets

(58) Field of Classification Search
CPC ............... G06T 7/33; G01N 21/9501; G01N 21/95607; G06F 17/5081; G03F 7/70616
See application file for complete search history.

(56) References Cited

U.S. PATENT DOCUMENTS

| | | |
|---|---|---|
| 7,570,796 B2 | 8/2009 | Zafar et al. |
| 7,676,077 B2 | 3/2010 | Kulkarni et al. |
| 8,664,594 B1 | 4/2014 | Jiang et al. |
| 8,692,204 B2 | 4/2014 | Kojima et al. |
| 8,698,093 B1 | 4/2014 | Gubbens et al. |
| 8,716,662 B1 | 5/2014 | MacDonald et al. |
| 2004/0218262 A1* | 11/2004 | Chuang ............... G01N 21/8806 359/366 |
| 2011/0286656 A1 | 11/2011 | Kulkarni et al. |
| 2012/0298862 A1 | 11/2012 | Chen et al. |
| 2013/0064442 A1 | 3/2013 | Chang et al. |
| 2013/0129189 A1 | 5/2013 | Wu et al. |
| 2014/0195992 A1 | 7/2014 | Ramachandran |
| 2016/0027164 A1* | 1/2016 | Duffy ................ G06T 5/50 382/151 |
| 2016/0188784 A1* | 6/2016 | Bhattacharyya .... G03F 7/70616 716/111 |
| 2016/0275672 A1* | 9/2016 | Bhattacharyya .......... G06T 7/33 |
| 2016/0292840 A1* | 10/2016 | Konecky ................ G06T 7/001 |

\* cited by examiner

SUB-PIXEL ALIGNMENT OF INSPECTION TO DESIGN

BACKGROUND OF THE INVENTION

1. Field of the Invention

This invention generally relates to methods and systems for determining a position of output generated by an inspection subsystem in design data space.

2. Description of the Related Art

The following description and examples are not admitted to be prior art by virtue of their inclusion in this section.

An integrated circuit (IC) design may be developed using a method or system such as electronic design automation (EDA), computer aided design (CAD), and other IC design software. Such methods and systems may be used to generate the circuit pattern database from the IC design. The circuit pattern database includes data representing a plurality of layouts for various layers of the IC. Data in the circuit pattern database may be used to determine layouts for a plurality of reticles. A layout of a reticle generally includes a plurality of polygons that define features in a pattern on the reticle. Each reticle is used to fabricate one of the various layers of the IC. The layers of the IC may include, for example, a junction pattern in a semiconductor substrate, a gate dielectric pattern, a gate electrode pattern, a contact pattern in an interlevel dielectric, and an interconnect pattern on a metallization layer.

The term "design data" as used herein generally refers to the physical design (layout) of an IC and data derived from the physical design through complex simulation or simple geometric and Boolean operations.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and thus higher profits. Inspection has always been an important part of fabricating semiconductor devices such as ICs. However, as the dimensions of semiconductor devices decrease, inspection becomes even more important to the successful manufacture of acceptable semiconductor devices because smaller defects can cause the devices to fail.

As design rules shrink, however, semiconductor manufacturing processes may be operating closer to the limitations on the performance capability of the processes. In addition, smaller defects can have an impact on the electrical parameters of the device as the design rules shrink, which drives more sensitive inspections. Therefore, as design rules shrink, the population of potentially yield relevant defects detected by inspection grows dramatically, and the population of nuisance defects detected by inspection also increases dramatically. Therefore, more and more defects may be detected on the wafers, and correcting the processes to eliminate of the defects may be difficult and expensive.

Recently, inspection systems and methods are increasingly being designed to focus on the relationship between defect and design since it is the impact on the design for a wafer that will determine whether and how much a defect matters. For example, some methods have been developed for aligning inspection and design coordinates. One such method depends on the accuracy of the inspection system coordinate registration to design. Another such method involves conducting post-processing alignment on the inspection image patch and associated design clip.

There are, however, a number of disadvantages to many of the existing inspection systems and methods. For example, when the methods depend on the accuracy of the inspection system coordinate registration to design, the methods do not necessarily provide the alignment accuracy that is needed. In addition, post-processing alignment of the inspection image patch and associated design clip is dependent on having sufficient information in the inspection patch and design clip. Often, it is the case that this criteria is not met, and the defects concerned cannot be used in the rest of the analysis or worse yet bad data is propagated through the remainder of the analysis thereby reducing the accuracy of the outcome.

Accordingly, it would be advantageous to develop systems and/or methods for determining a position of output generated by an inspection subsystem in design data space that do not have one or more of the disadvantages described above.

SUMMARY OF THE INVENTION

The following description of various embodiments is not to be construed in any way as limiting the subject matter of the appended claims.

One embodiment relates to a system configured to determine a position of output generated by an inspection subsystem in design data space. The system includes an inspection subsystem that includes at least an energy source and a detector. The energy source is configured to generate energy that is directed to a specimen. The detector is configured to detect energy from the specimen and to generate output responsive to the detected energy. The output includes frames of the output.

The system also includes one or more computer subsystems configured for selecting one or more alignment targets for the specimen such that one or more of the alignment targets appear in each of the frames generated by the inspection subsystem for the specimen. The computer subsystem(s) are also configured for aligning one or more images for each of the alignment targets to its corresponding portion of a design for the specimen. In addition, the computer subsystem(s) are configured for determining an offset between the output and the design for each zone of the output based on results of aligning the one or more images generated for one or more of the alignment targets located therein. Each zone includes one or more of the frames. The computer subsystem(s) are further configured for aligning output generated by the inspection subsystem at each position of each of the alignment targets on the specimen to the one or more images for the alignment targets. The computer subsystem(s) are also configured for determining, for each alignment target, an additional offset between the output generated at its corresponding position on the specimen and its corresponding one or more images based on results of aligning the output. The system may be further configured as described herein.

Another embodiment relates to a computer-implemented method for determining a position of output generated by an inspection subsystem in design data space. The method includes steps for each of the functions of the one or more computer subsystems described above. The steps of the method are performed by one or more computer systems. The method may be performed as described further herein. In addition, the method may include any other step(s) of any other method(s) described herein. Furthermore, the method may be performed by any of the systems described herein.

An additional embodiment relates to a non-transitory computer-readable medium storing program instructions executable on a computer system for performing a computer-implemented method for determining a position of output generated by an inspection subsystem in design data space. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Other objects and advantages of the invention will become apparent upon reading the following detailed description and upon reference to the accompanying drawings in which.

Figure 1:
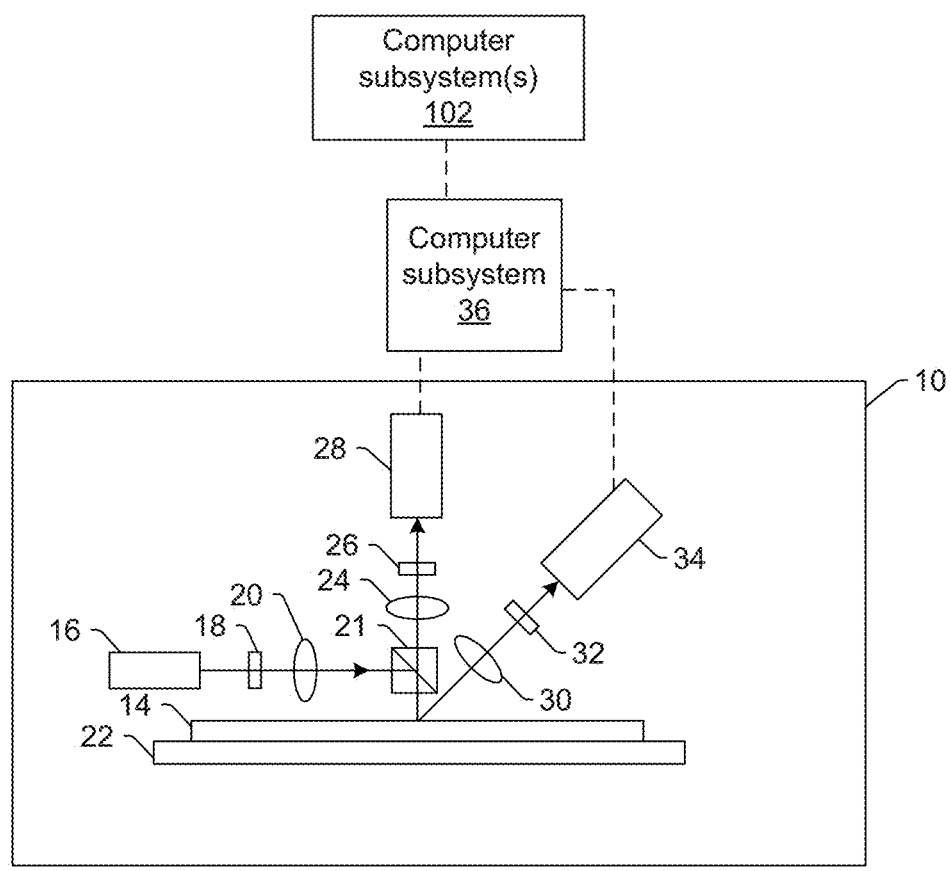
FIGS. 1 and 2 are schematic diagrams illustrating side views of embodiments of a system configured as described herein.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The terms "design" and "design data" as used herein generally refer to the physical design (layout) of an IC and data derived from the physical design through complex simulation or simple geometric and Boolean operations. In addition, an image of a reticle acquired by a reticle inspection system and/or derivatives thereof can be used as a "proxy" or "proxies" for the design. Such a reticle image or a derivative thereof can serve as a substitute for the design layout in any embodiments described herein that use a design. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data.

In general, however, the design information or data cannot be generated by imaging a wafer with a wafer inspection system. For example, the design patterns formed on the wafer may not accurately represent the design for the wafer and the wafer inspection system may not be capable of generating images of the design patterns formed on the wafer with sufficient resolution such that the images could be used to determine information about the design for the wafer. Therefore, in general, the design information or design data cannot be generated using a physical water. In addition, the "design" and "design data" described herein refers to information and data that is generated by a semiconductor device designer in a design process and is therefore available for use in the embodiments described herein well in advance of printing of the design on any physical wafers.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured to determine a position of output generated by an inspection subsystem in design data space. The embodiments may be configured for pattern to design alignment (PDA). PDA accuracy is critical for certain types of specimen inspection such as those in which design information is used during inspection to perform one or more functions such as those described further herein.

In one embodiment, the specimen includes a wafer. In another embodiment, the specimen includes a reticle. The wafer and the reticle may include any wafer and reticle known in the art.

One embodiment of such a system is shown in FIG. 1. The system includes an inspection subsystem that includes at least an energy source and a detector. The energy source is configured to generate energy that is directed to a specimen. The detector is configured to detect energy from the specimen and to generate output responsive to the detected energy.

In one embodiment, the energy directed to the specimen includes light, and the energy detected from the specimen includes light. For example, in the embodiment of the system shown in FIG. 1, inspection subsystem 10 includes an illumination subsystem configured to direct light to specimen 14. The illumination subsystem includes at least one light source. For example, as shown in FIG. 1, the illumination subsystem includes light source 16. In one embodiment, the illumination subsystem is configured to direct the light to the specimen at one or more angles of incidence, which may include one or more oblique angles and/or one or more normal angles. For example, as shown in FIG. 1, tight from light source 16 is directed through optical element 18 and then lens 20 to beam splitter 21, which directs the light to specimen 14 at a normal angle of incidence. The angle of incidence may include any suitable angle of incidence, which may vary depending on, for instance, characteristics of the specimen and the defects to be detected on the specimen.

The illumination subsystem may be configured to direct the light to the specimen at different angles of incidence at different times. For example, the inspection subsystem may be configured to alter one or more characteristics of one or more elements of the illumination subsystem such that the light can be directed to the specimen at an angle of incidence that is different than that shown in FIG. 1. In one such example, the inspection subsystem may be configured to move light source 16, optical element 18, and lens 20 such that the light is directed to the specimen at a different angle of incidence.

In some instances, the inspection subsystem may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing light having different or the same characteristics to the specimen at different or the same angles of incidence sequentially or simultaneously.

In one embodiment, light source 16 may include a broadband plasma (BBP) light source. In this manner, the light generated by the light source and directed to the specimen may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused to beam splitter 21 by lens 20. Although lens 20 is shown in FIG. 1 as a single refractive optical element, it is to be understood that, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for inspection.

The inspection subsystem may also include a scanning subsystem configured to cause the light to be scanned over the specimen. For example, the inspection subsystem may include stage 22 on which specimen 14 is disposed during inspection. The scanning subsystem may include any suitable mechanical and/or robotic assembly (that includes stage 22) that can be configured to move the specimen such that the light can be scanned over the specimen. In addition, or alternatively, the inspection subsystem may be configured such that one or more optical elements of the inspection subsystem perform some scanning of the light over the specimen. The light may be scanned over the specimen in any suitable fashion.

The inspection subsystem further includes one or more detect on channels. At least one of the one or more detection channels includes a detector configured to detect light from the specimen due to illumination of the specimen by the inspection subsystem and to generate output responsive to the detected light. For example, the inspection subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, one detection channel is configured to detect specularly reflected light, and the other detection channel is configured to detect light that is not specularly reflected (e.g., scattered, diffracted, etc.) from the specimen. However, two or more of the detection channels may be configured to detect the same type of light from the specimen (e.g., specularly reflected light). Although FIG. 1 shows an embodiment of the inspection subsystem that includes two detection channels, the inspection subsystem may include a different number of detection channels (e.g., only one detection channel or two or more detection channels). Although each of the collectors are shown in FIG. 1 as single refractive optical elements, it is to be understood that each of the collectors may include one or more refractive optical element(s) and/or one or more reflective optical element(s).

The one or more detection channels may include any suitable detectors known in the art. For example, the detectors may include photo-multiplier tubes (PMTs), charge coupled devices (CCDs), and time delay integration (TDI) cameras. The detectors may also include any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the inspection subsystem may be signals or data, but not image signals or image data. In such instances, a computer subsystem such as computer subsystem 36 of the system may be configured to generate images of the specimen from the non-imaging output of the detectors. However, in other instances, the detectors may be configured as imaging detectors that are configured to generate imaging signals or image data. Therefore, the system may be configured to generate the output described herein in a number of ways.

It is noted that FIG. 1 is provided herein to generally illustrate a configuration of an inspection subsystem that may be included in the system embodiments described herein. Obviously, the inspection subsystem configuration described herein may be altered to optimize the performance of the system as is normally performed when designing a commercial inspection system. In addition, the systems described herein may be implemented using an existing inspection system (e.g., by adding functionality described herein to an existing inspection system) such as the 28xx and 29xx series of tools that are commercially available from KLA-Tencor. For some such systems, the methods described herein may be provided as optional functionality of the system (e.g., in addition to other functionality of the system). Alternatively, the system described herein may be designed "from scratch" to provide a completely new system.

Computer subsystem 36 of the system may be coupled to the detectors of the inspection subsystem in any suitable manner (e.g., via one or more transmission media, which may include "wired" and/or "wireless" transmission media) such that the computer subsystem can receive the output generated by the detectors during scanning of the specimen. Computer subsystem 36 may be configured to perform a number of functions using the output of the detectors as described herein and any other functions described further herein. This computer subsystem may be further configured as described herein.

This computer subsystem (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems as described further herein. For example, computer subsystem 36 may be coupled to computer subsystem(s) 102 (as shown by the dashed line in FIG. 1) by any suitable transmission media, which may include any suitable wired and/or wireless transmission media known in the art. Two or more of such computer subsystems may also be effectively coupled by a shared computer-readable storage medium (not shown).

Although the inspect on subsystem is described above as being an optical or light-based inspection subsystem, the inspection subsystem may be an electron beam-based inspection subsystem. For example, in one embodiment, the energy directed to the specimen includes electrons, and the energy detected from the specimen includes electrons. In this manner, the energy source may be an electron beam source. In one such embodiment shown in FIG. 2, the inspection subsystem includes electron column 122, which is coupled to computer subsystem 124.

Figure 2:
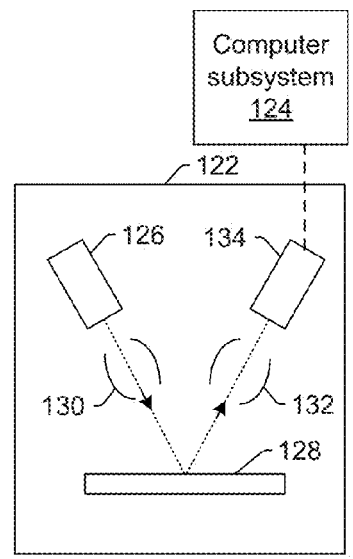

As also shown in FIG. 2, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 2 as being configured such that the electrons are directed to the specimen at an oblique angle of incidence and are scattered from the specimen at another oblique angle, it is to be understood that the electron beam may be directed to and scattered from the specimen at any suitable angles. In addition, the electron beam-based subsystem may be configured to use multiple modes to generate images of the specimen (e.g., with different illumination angles, collection angles, etc.). The multiple modes of the electron beam-based subsystem may be different in any image generation parameters of the subsystem.

Computer subsystem 124 may be coupled to detector 134 as described above. The detector may detect electrons returned from the surface of the specimen thereby forming electron beam images of the specimen. The electron beam images may include any suitable electron beam images. Computer subsystem 124 may be configured to perform any of the functions described herein using the output of the detector and/or the electron beam images. Computer subsystem 124 may be configured to perform any additional step(s) described herein. A system that includes the inspection subsystem shown in FIG. 2 may be further configured as described herein.

It is noted that FIG. 2 is provided herein to generally illustrate a configuration of an electron beam-based inspection subsystem that may be included in the embodiments described herein. As with the optical inspection subsystem described above, the electron beam-based inspection subsystem configuration described herein may be altered to optimize the performance of the inspection subsystem as is normally performed when designing a commercial inspection system. In addition, the systems described herein may be implemented using an existing inspection system (e.g., by adding functionality described herein to an existing inspection system) such as the eSxxx series of tools that are commercially available from KLA-Tencor. For some such systems, the methods described herein may be provided as optional functionality of the system (e.g., in addition to other functionality of the system). Alternatively, the system described herein may be designed "from scratch" to provide a completely new system.

Although the inspect on subsystem is described above as being a light-based or electron beam-based inspection subsystem, the inspection subsystem may be an ion beam-based inspection subsystem. Such an inspection subsystem may be configured as shown in FIG. 2 except that the electron beam source may be replaced with any suitable ion beam source known in the art. In addition, the inspection subsystem may be any other suitable ion beam-based subsystem such as those included in commercially available focused ion beam (FIB) systems, helium ion microscopy (HIM) systems, and secondary ion mass spectroscopy (SIMS) systems.

The one or more computer subsystems described above are configured for selecting alignment targets for the specimen such that one or more of the alignment targets appear in each of the frames generated by the inspection subsystem for the specimen. In other words, the alignment targets are selected such that each frame includes at least one alignment target. In still other words, the alignment targets are selected such that each frame of output for the specimen includes output for at least one alignment target formed on the wafer. Selecting the alignment targets may be performed in a number of different ways as described further herein.

The output generated by any of the inspection subsystems described herein includes frames of the output. For example, regardless of whether the detector(s) of the inspection subsystem produce signals and/or images, a "frame" may be generally defined as a relatively small portion of output (e.g., signals or image portions (e.g., pixels)) generated by an inspection subsystem that can be collectively processed as a unit by the system. Therefore, a "frame" of output can vary depending on the inspection subsystem configuration as well as the configuration of any components included in the system for handling and/or processing of the output generated by the inspection subsystem. For example, a swath or a sub-swath of output generated for a specimen may be divided into multiple frames such that data handling and processing of the frames can be performed much more easily than if the entire swath or subswath of output is processed simultaneously.

Figure 3:
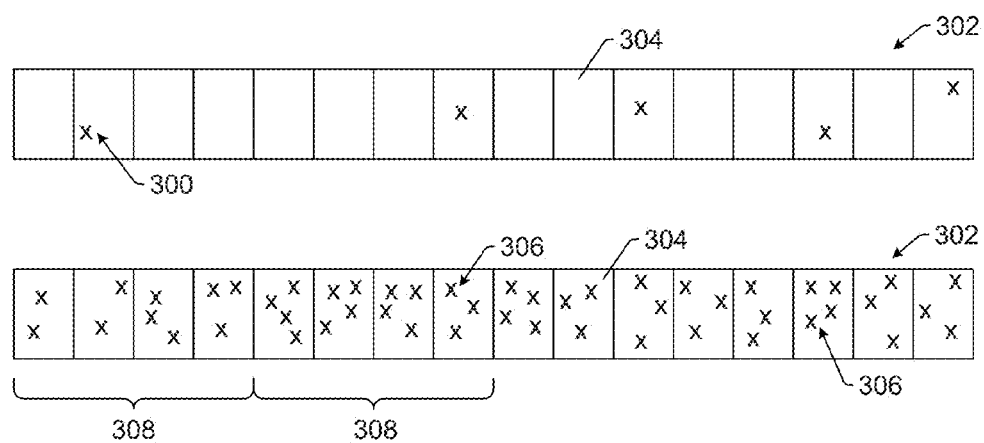
FIG. 3 is a schematic diagram illustrating a plan view of one example of currently is used alignment targets for multiple frames of output of an inspection subsystem and one embodiment of alignment targets selected as described herein for multiple frames of output of an inspection subsystem.

Multiple zones may be defined in the output, and each zone includes one or more of the frames. In other words, a zone can be a single image frame or multiple image frames. For example, for a given subswath, there could be 1000 frames and 100 zones (with 10 frames in each zone). In one embodiment, each zone includes 10 or fewer of the frames. For example, as shown in FIG. 3, zone 308 includes four frames 304 of subswath 302. Although only two zones 308 are shown in FIG. 3, all of the frames included in the subswath may be separated into zones such that every frame is included in a zone.

In one embodiment, selecting the alignment targets includes selecting the alignment targets at a spatial frequency across the specimen that is higher than or equal to a frequency that causes deformation of images generated from the output of the inspection subsystem. For example, an image of a design printed on a specimen is not always as "rigid" as the design itself. Image jittering, temperature dependent specimen expansion, optical distortion associated with the inspection tool, etc. can cause deformation of the image. In addition, a manufacturing process performed on the specimen can also contribute to deformation of the design in an image of the specimen compared to the design itself. Therefore, based on information about the expected deformation of an image of a design formed on a specimen, the alignment targets can be selected such that the spatial frequency of the alignment targets is greater than or equal to the frequency of the deformation. In this manner, the alignment targets that are selected can be used to substantially accurately align output of an inspection subsystem to a design regardless of the deformation of the design in the image compared to the design itself.

Figure 4:
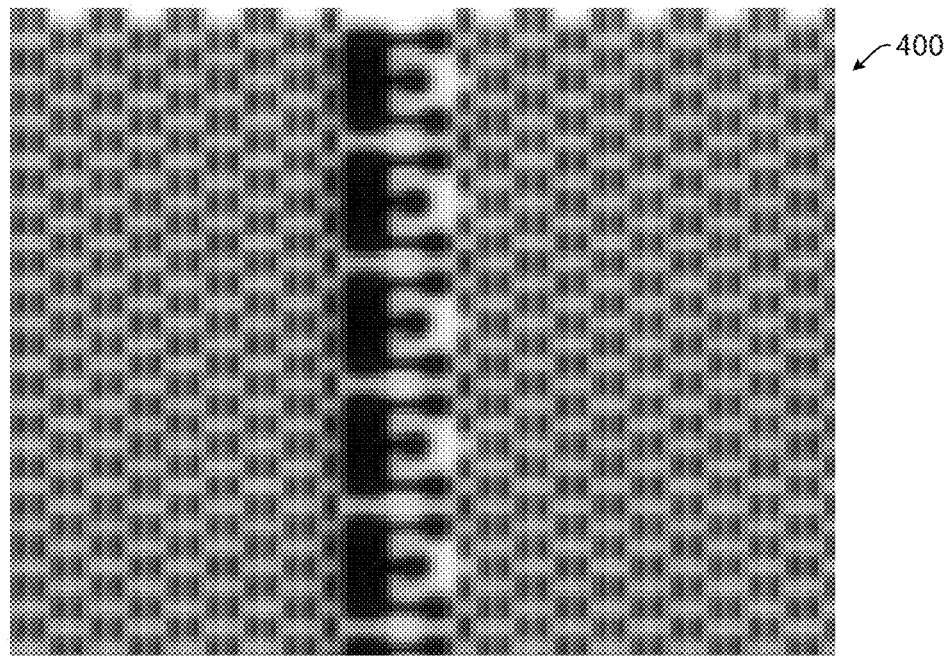
FIG. 4 is an image of at least a portion of a die formed on a specimen that exhibits substantially no deformation in the image.
Figure 5:
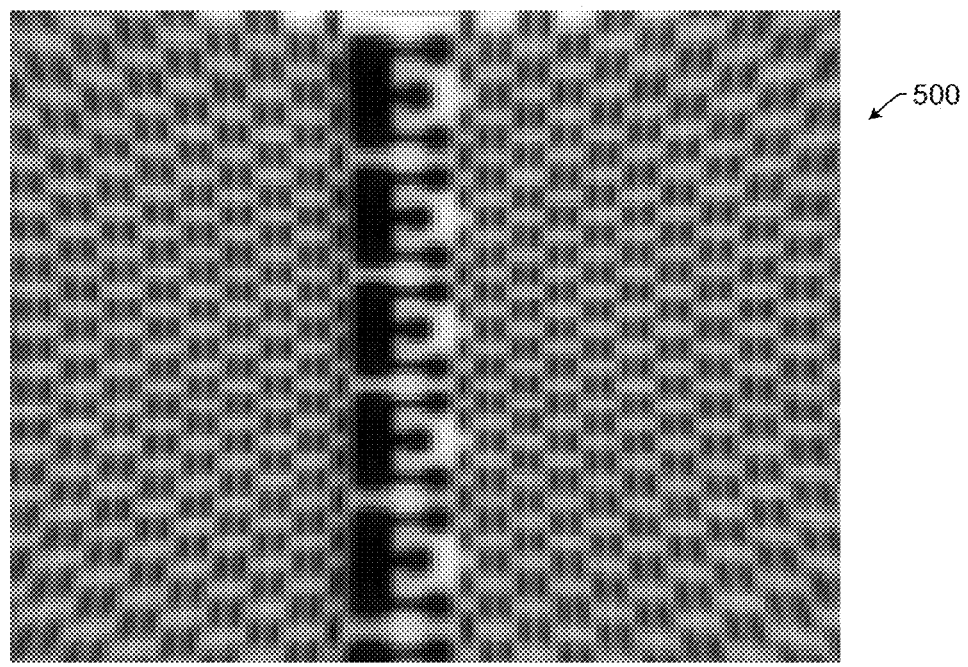
FIG. 5 is an image of at least a portion of a die, having the same design as the at least the portion of the die shown in the image of FIG. 4, that exhibits deformation in the image.

One such example of how an image of a design printed on a specimen at the die level can be warped is illustrated by the images shown in FIGS. 4 and 5. More specifically, as shown in image 400 in FIG. 4, the design for the die appears in a desired (rigid) manner in the image of the die. In this manner, the image of the design will match (or substantially match) the design itself. However, as shown in image 500 in FIG. 5, the design for the die appears warped in the image in that the design has local shift errors from design. In this manner, the image shown in FIG. 5 is warped at the die level, which may be caused by factors such as jitter, temperature-caused expansion, optical distortion, etc. In addition, although one type of warping deformation is showed in FIG. 5, the embodiments described herein can be used regardless of how the image of the design is deformed (assuming that knowledge of such image deformation can be acquired and used to determine how frequently across the design an alignment target is to be selected).

Figure 6:
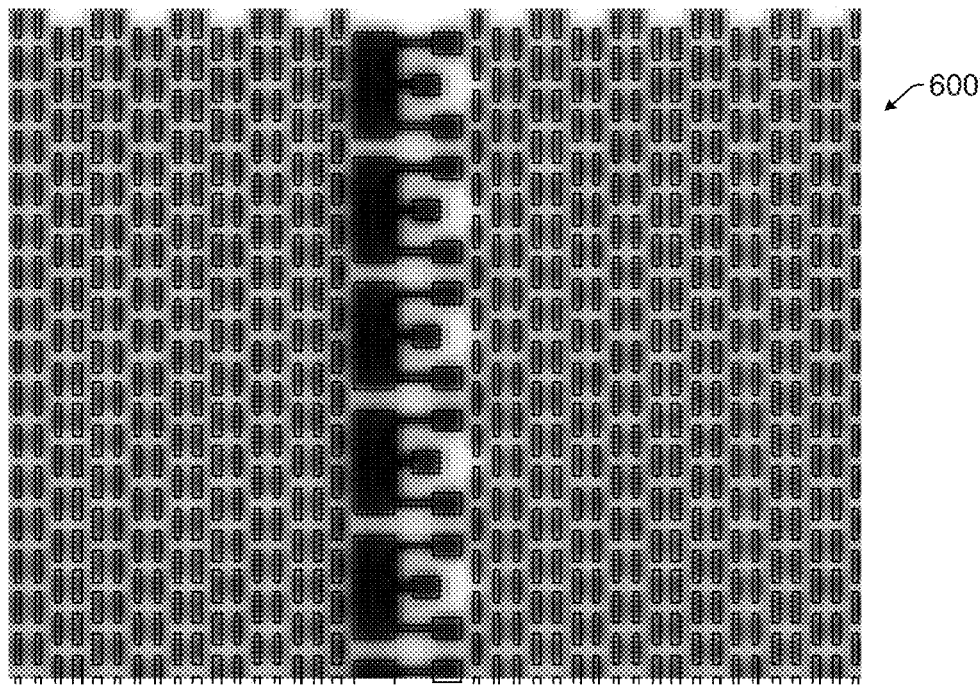
FIG. 6 is the image of FIG. 4 and information for the design of the at least the portion of the die aligned thereto.
Figure 7:
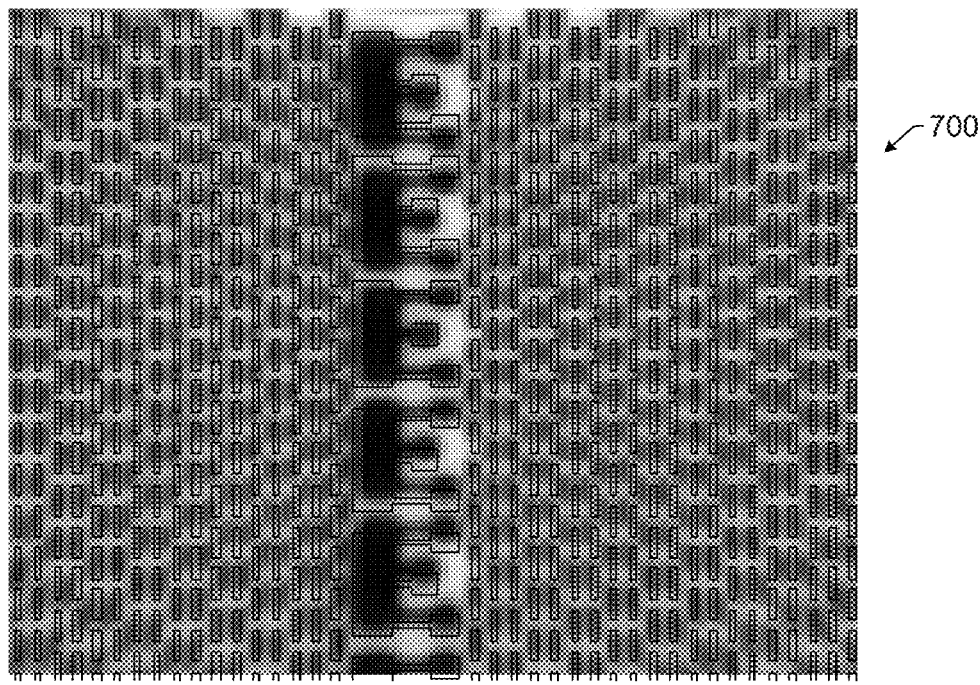
FIG. 7 is the image of FIG. 5 and information for the design of the at least the portion of the die aligned thereto.

In contrast to the embodiments described herein, currently used PDA methods and systems align pattern to design much more coarsely than the embodiments described herein, which can make it relatively difficult to use those currently used PDA methods and systems for 1× design rule use cases. For example, FIGS. 6 and 7 illustrate how differently the design information aligns to the image of the design on the specimen when the image exhibits deformation compared to the design. For example, FIG. 6 shows results 600 of aligning design information, which is shown in FIG. 6 by the outlined polygons, with the image of FIG. 4. As shown in FIG. 6, the design information can be substantially aligned to the image across the entire portion of the die shown in the image since the image of the design exhibits substantially little deformation compared to the design itself. In contrast, FIG. 7 shows results 700 of aligning design information, which is shown in FIG. 7 by the outlined polygons, with the image of FIG. 5. As shown in FIG. 7, the design information cannot be properly aligned to a substantial portion of the features shown in the image since the image of the design exhibits substantial deformation compared to the design itself. Therefore, the warped image does not substantially match the rigid design.

In currently used PDA methods and systems, in which an image is aligned to design relatively coarsely, an image such as those shown in FIGS. 4-7 may be separated into multiple subswaths (not shown). For example, the images may be separated into 5 subswaths, and each subswath may extend across an entire dimension of the image in the x direction and only a portion of an entire dimension of the image in the y direction. The currently used PDA may then align the image to design relatively coarsely for each subswath. For example, in currently used PDA that performs relatively coarse alignment between image and design, the PDA set up may include scanning one die on the specimen to find targets that are substantially evenly distributed across the die. In one such example, as shown in FIG. 3, in currently used PDA, a few alignment target sites 300 may be selected in subswath 302, which is itself made up of multiple frames 304 of output. As can be seen by the number of alignment target sites 300 shown in FIG. 3, relatively few alignment target sites are used in currently used PDA, and the alignment performed at each of the alignment target sites is, in currently used PDA, used to determine a single overall offset in the x and y directions for the entire subswath. In other words, the alignment target sites are used collectively to determine a single x and y shill (i.e., dx and dy) for the entire subswath. In this manner, currently used PDA uses only a few PDA sites in each subswath to generate a single x and y offset between an image and design.

During run time, currently used PDA may determine offsets between the setup image and the run time image for each alignment target. Those offsets in combination with the setup image to design offsets per subswath may be used to determine offsets between design and run time image for each subswath. In this manner, the currently used PDA may reduce some error in the alignment caused by the local shift errors from design in a warped image. However, due to the relatively coarse selection of the alignment targets within the subswaths of the image, the currently used PDA will not be able to reduce all errors in the alignment caused by the local shift errors from design in a warped image.

In contrast, the embodiments described herein are configured to achieve subpixel accuracy of PDA by selecting PDA targets frequently enough to follow the highest frequency that causes non-rigid image formation, which typically will require multiple PDA targets within each image frame. For example, as shown in FIG. 3, in the subpixel PDA described herein, multiple alignment target sites 306 are selected in each frame 304. The multiple sites in each frame may then be used as described further herein to determine a single x and y offset (i.e., dx and dy) in each image frame. Therefore, the subpixel PDA described herein may select multiple PDA sites within each image frame to produce x and y offsets in each frame.

Figure 8:
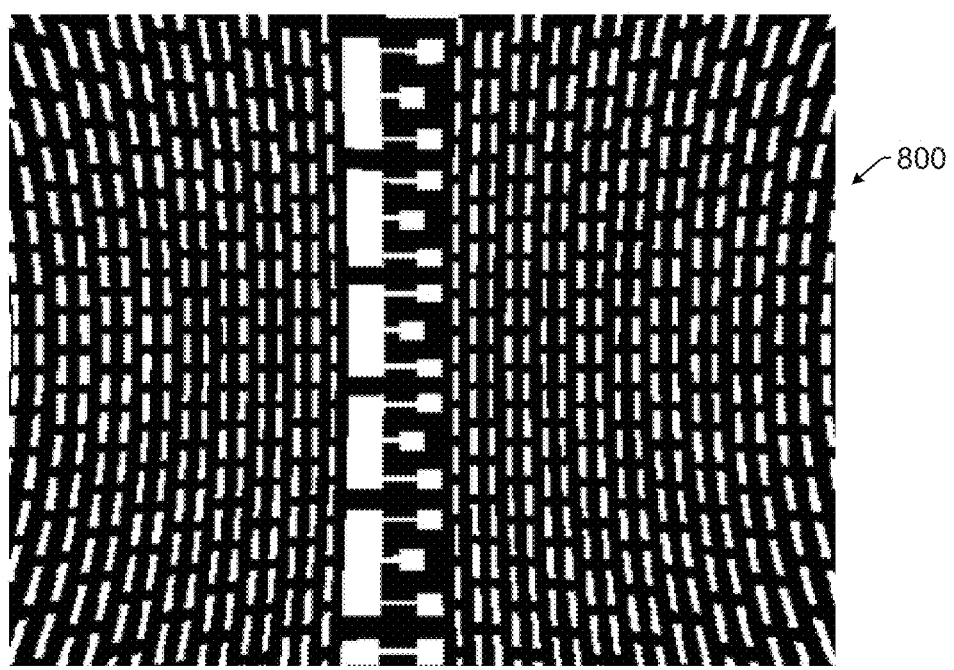
FIG. 8 is a schematic diagram showing information for the design of the at least the portion of the die shown in the image of FIG. 5 generated by separately modifying different portions of the design based on the deformation of the design in the image of FIG. 5.

In another embodiment, the computer subsystem(s) are configured for generating the design used for aligning the one or more images as described further herein by separately modifying different portions of the design corresponding to each of the frames based on deformation of images generated for the specimen from the output of the inspection subsystem. For example, the design may be shifted within each image frame to match the image acquired for the specimen substantially accurately. In one such example, as shown in shifted design 800 shown in FIG. 8, the information for the design may be modified by shifting different portions of the design by different amounts based on information about how the image will be shifted on a frame by frame basis. In this manner, the shifted design may more accurately reflect the design as it appears in an image of the specimen. For example, as shown by comparison of image 500 shown in FIG. 5 and shifted design 800 shown in FIG. 8, the shifted design appears much more like the warped image than the non-warped image shown in FIG. 4. Therefore, if the shifted design information is used for alignment to a warped image of the specimen, the alignment can be performed relatively accurately for each image frame in the warped image. The degree and manner of the shifting of the design in the image can be determined in any suitable manner (e.g., experimentally, theoretically, etc.). In addition, the design information may be shifted based on such information in any suitable manner.

Figure 9:
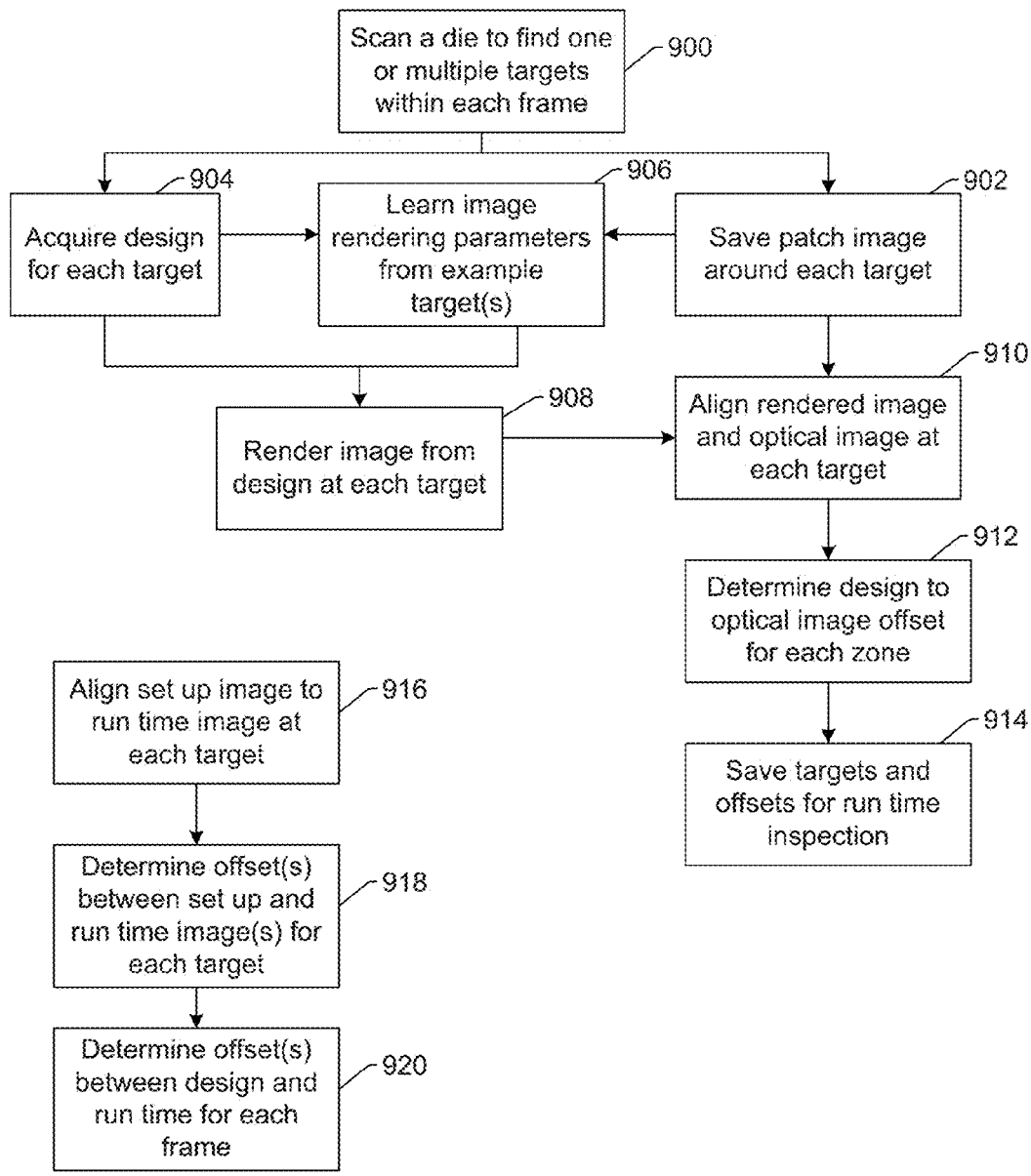
FIG. 9 is a flow diagram illustrating one embodiments of steps that may be performed by one or more computer subsystem embodiments described herein for determining a position of output generated by an inspection subsystem in design data space.

In some instances, the computer subsystem(s) may be configured for causing the inspection subsystem to scan a die to find one or multiple alignment targets within each frame, as shown in step 900 of FIG. 9. In this manner, an entire die on the specimen (or as much of the die as will be inspected during an inspection process using the inspection subsystem) can be scanned thereby generating output for the specimen and finding one or multiple targets in each frame of the output that is/are suitable for alignment of the inspection output to design. As shown in step 902 of FIG. 9, the computer subsystem(s) may also be configured for saving a patch image around each target. The patch image may be the image or part of the image generated by the inspection subsystem at an alignment target site and may be saved in any suitable manner. In such embodiments, the computer subsystem(s) may also be configured to acquire a portion of the design for each target. For example, once a portion of the design printed on the specimen has been selected as a target, the computer subsystem(s) may search the design for the specimen for a corresponding portion of the design and then acquire that portion of the design for the target. These steps may be performed during set up of an inspection process to be performed on the specimen.

Selecting the alignment targets may be performed using the specimen itself as described above or design data for the specimen, and the design data may include any of the different types of design data described herein. In this manner, in some embodiments, selecting the alignment targets is performed without using a physical version of the specimen. For example, the embodiments described herein do not necessarily select the alignment targets by scanning a specimen on which the design has been printed or formed and then selecting the alignment targets based on the results of the scanning. In this manner, the alignment targets described herein may be acquired from the design for the specimen and aligned to corresponding specimen images as described further herein (instead of starting from a specimen image to acquire a target image and grabbing corresponding design clips or portions of the design for alignment). In this manner, once an alignment target has been selected using the design, the computer subsystem(s) may acquire a design for each target. These steps may be performed during set up of an inspection process to be performed on the specimen with the inspection subsystem.

Such embodiments may have, therefore, a number of advantages such as selecting the alignment targets using the design for the specimen can be performed offline. Therefore, offline design target grabbing can free up tool time for vital production inspection runs. In contrast, selecting the alignment targets by performing image grabbing on tool can add setup time e.g., 10 to 15 minutes) to the inspection process setup.

In another embodiment, at least a portion of the alignment targets includes two or more alignment targets having the same characteristics. For example, two or more (or all) of the targets may be the same. Two or more of the alignment targets may, therefore, have the same shape, size, proportions, orientations, and any other characteristics that can be used to describe the alignment targets. In some embodiments, at least a portion of the alignment targets includes two or more alignment targets having the same characteristics except for within die position. For example, in some instances, all of the targets may be the same (as described further herein by having all of the same characteristics) and may be distributed across a die.

The computer subsystem(s) are also configured for aligning one or more images for each of the alignment targets to it corresponding portion of a design for the specimen. Aligning such images to their corresponding portions of the design may be performed in a number of different manners. For example, such an image may be aligned to its corresponding portion of the design by pattern matching or any other suitable aligning method and/or algorithm known in the art. The one or more images that are aligned to their corresponding portions of the design may include different types of images described herein. In addition, the portions of the design used in this aligning step may include different types of information such as the design data itself or other types of design information described herein. This step may be performed during set up of an inspection process to be performed on the specimen with the inspection subsystem.

In one embodiment, the computer subsystem(s) are configured for generating one or more simulated images illustrating how different portions of the design will appear in images generated by the inspection subsystem, and aligning the one or more images includes aligning the one or more images to the one or more simulated images. These steps may be performed during set up of an inspection process to be performed on the specimen with the inspection subsystem. In some such embodiments, the computer subsystem(s) may be configured for learning image rendering parameters from example targets. For example, as shown in FIG. 9, targets that have been selected as described further herein may be used for acquiring the design for each target, as shown in step 904, which may be performed as described further herein. The targets and the design acquired for each of the targets may then be used for learning image rendering parameters for example targets, as shown in step 906. Learning the image rendering parameters may be performed in any suitable manner as in setting up and/or calibrating a simulation model or method). The example targets may include sampled sites that mostly are located in the logic region. In addition, the example targets may include a selection of representative samples from some portion of the die that covers various patterns, e.g., dense geometry, sparse geometry, etc.

The computer subsystem(s) may then render images from the design at each target, as shown in step 908 in FIG. 9. The difficulty of alignment between optical image(s) and design may be minimized by rendering a simulated image from design that appears substantially similar to image(s) that would be generated by the inspection subsystem for a specimen on which the design has been printed or formed to thereby achieve reasonable alignment accuracy. To generate the most accurate simulated images, the simulation can involve the simulation of electromagnetic (EM) field by solving Maxwell's equations from three-dimensional information for the chip design and material, followed by simulation of the optical (or electron beam) parameters of the inspection subsystem used to form an image of the specimen. Otherwise, oversimplified rendering can produce a less satisfactory result with alignment to the real image (e.g., optical or electron beam).

In addition, the computer subsystem(s) may then align the rendered image and the optical (or electron beam) image at each target. For example, as shown in step 910 in FIG. 9, the computer subsystem(s) may be configured for aligning the rendered image and optical image at each target. Aligning the rendered image and the optical image may be otherwise performed as described herein. In addition, such steps may be performed for electron beam images. As described further herein, the target selection may be performed offline. Due to the offline nature of the target selection, a better rendering algorithm and/or method (e.g., more complex and time consuming to perform) can be used for simulating the images that would be generated by the inspection subsystem for the targets, which can provide simulated images that more closely match how the targets will be printed on the specimen and imaged by the inspection subsystem thereby reducing match result variability due to inaccurate design rendering.

The computer subsystem(s) are also configured for determining an offset between the output and the design for each zone of the output based on results of aligning the one or more images generated for one or more of the alignment targets located therein. In this manner, the computer subsystem(s) described herein may be configured to determine design-to-image offsets. For example, as shown in step 912 of FIG. 9, the computer subsystem(s) may be configured for determining a design to (optical or electron beam image offset for each zone. In one such example, for each frame, the computer subsystem(s) may determine a distance (offset) between each frame and its corresponding design based on the alignment of the design and image(s) for each alignment target in each frame, respectively. In this manner, determining the one or more offsets is performed for each inspection frame of the output generated by the inspection subsystem for the specimen. For example, the computer subsystem(s) may be configured to determine design-to-image offsets for each inspection frame from the target(s). For subpixel PDA, the computer subsystem(s) may reject outlier distance(s) (offset(s)) determined for each frame within a zone and then determine an offset per zone to get better offset granularity along the x direction, which in turn would result in better care area placement accuracy and defect localization accuracy during runtime. The computer subsystem(s) may also be configured for saving information for each alignment target and its determined offset to a computer-readable storage medium such as a database or one of the other storage media described herein for run time inspection. For example, as shown in step 914 of FIG. 9, the computer subsystem(s) may be configured for saving targets and offsets for run time inspection. These steps may be performed during set up of an inspection process to be performed on the specimen with the inspection subsystem.

The design-to-image offsets may be determined in any suitable manner based on the one or more portions of the design that match the one or more images and their corresponding design data space coordinates and inspection space (e.g., inspection subsystem or specimen) coordinates, respectively. The design-to-image offsets may have any suitable format (e.g., a function or formula). In addition, information for the design-to-image offsets may be stored in any suitable storage media described herein. Furthermore, the design-to-image offsets may be determined in one only direction e.g., the x or the y direction) or in two directions (e.g., the x and y directions). Moreover, the design-to-image offsets may be determined using design data space and inspection space coordinates having any suitable format (e.g., polar and Cartesian coordinates).

The computer subsystem(s) are further configured for aligning output generated by the inspection subsystem at each position of each of the alignment targets on the specimen to the one or more images for the alignment targets. For example, the computer subsystem(s) may be configured for aligning an image acquired during set up to an image acquired at run time. In one such example, as shown in step 916 in FIG. 9, the computer subsystem(s) may be configured for aligning the set up image to run time image at each target. In addition, such aligning may be performed during run time of an inspection process performed on the specimen with the inspection subsystem. Such aligning may be further performed as described herein. The output generated by the inspection subsystem and used for this step may include any of the output described herein.

The computer subsystem(s) are also configured for determining, for each alignment target, an additional offset between the output generated at its corresponding position on the specimen and its corresponding one or more images based on results of aligning the output. For example, as shown in step 918 of FIG. 9, the computer subsystem(s) may be configured for determining offset(s) between set up and run time image(s) for each target. In this manner, the computer subsystem(s) may be configured for determining offset(s) between an image acquired during set up and an image acquired at run time for each target. Therefore, the additional offset(s) may be a relationship between two different images generated from inspection subsystem output. As such, the additional offset(s) may be configured for translating one set of inspection subsystem or specimen space coordinates to another set of inspection subsystem or specimen space coordinates. Determining the additional offset(s) may be performed during run time of an inspection process performed on the specimen with the inspection subsystem. Determining the additional offset(s) may be performed as described further herein. In addition, the additional offset(s) may be further configured as described herein.

In one embodiment, determining the additional offsets is performed for each inspection frame of the output generated by the inspection subsystem for the specimen. For example, since each inspection frame includes one or more alignment targets, and since determining the additional offsets is performed for each alignment target, determining the additional offsets is performed for each inspection frame. In this manner, the computer subsystem(s) may be configured for determining offset(s) between an image acquired during set up and an image acquired during run time for each inspection frame.

The computer subsystem(s) are further configured for determining, for each of the frames, design data space positions of output generated by the inspection subsystem at other positions on the specimen located therein based on the offset determined for its corresponding zone, the additional offset determined for each of the alignment targets located therein, and specimen space positions of the output generated at the other positions located therein. Determining the design data space positions of the output may be performed during run time of an inspection process performed on the specimen with the inspection subsystem. In this manner, design data space positions can be determined for inspection subsystem output other than that corresponding to the alignment target(s). In one such example, the specimen space positions of the output generated at non-alignment target positions may be input to the additional offset(s) to thereby determine coordinates of the output with respect to the set up image (the image of the alignment target acquired by the inspection subsystem). In this manner, the inspection subsystem or specimen space coordinates may be translated to other inspection subsystem or specimen space coordinates with the additional offset(s). Those translated inspection subsystem or specimen space coordinates may then be input to the one or more offsets to translate the new inspection subsystem or specimen space coordinates to design data space coordinates.

Aligning the inspection results to the design data space may therefore include determining design data space coordinates for the inspection results. The inspection results for which the design data space positions are determined may include any of the inspection results described herein including the raw output (data or images) generated by a detector of the inspection subsystem or a computer subsystem described herein and/or such raw output after it has been processed in some manner and may include output that corresponds to defects and/or output that does not correspond to defects detected on the specimen. The inspection results may be aligned to the design data space using the alignment targets at any suitable time including before and after defect detection has been performed for the specimen.

In one embodiment, the design data space positions of the output are determined with sub-pixel accuracy. In this manner, the embodiments described herein may be configured for sub-pixel PDA. In another embodiment, the alignment targets include one or more subpixel patterns. For example, as described herein, the alignment targets may be selected at a frequency that is based on a frequency of deformation of an image of a design formed on a specimen. In this manner, the alignment targets may be selected at a frequency across the specimen (and/or the design) that results in the elimination (or substantial elimination) of all error sources in the alignment process. Therefore, the embodiments described herein are advantageously capable of determining the design data space positions of the output of the inspection subsystem with sub-pixel accuracy. The subpixel patterns may include any such patterns known in the art.

Some step(s) described herein may also be consolidated or performed somewhat differently. For example, the one or more offsets and the one or more additional offsets may be translated into a single set of offsets that can be used to translate inspection subsystem or specimen space coordinates at locations other than the alignment targets directly to design data space coordinates. In one such example, in some embodiments, determining the design data space positions includes determining, for each of the frames, one or more further offsets between the output generated by the inspection subsystem at the other positions on the specimen located therein and its corresponding portion of the design based on the offset determined for its corresponding zone and the additional offset determined for each of the alignment targets located therein and determining the design data space positions based on the one or more further offsets and the specimen space positions of the output generated at the other positions located therein. For example, the computer subsystem(s) may be configured for determining offsets between design and run time images for each frame, as shown in step 920 of FIG. 9. Determining the one or more further offsets may be performed during set up or run time of an inspection process performed on the specimen with the inspection subsystem. The one or more further offsets may otherwise be configured as described herein.

In some embodiments, the computer subsystem(s) are configured for detecting defects on the specimen based on the output generated at the other positions and determining one or more parameters used for detecting the defects based on the design data space positions of the output generated at the other positions. Detecting the defects on the specimen may be performed in any suitable manner known in the art (e.g., applying a threshold to the output and determining that any output having a value above the threshold corresponds to a defect or a potential defect) with any suitable defect detection method and/or algorithm. The one or more defect detection parameters that are determined may include any adjustable parameters used for defect detection, and particularly those that relate to the sensitivity of the defect detection (e.g., a threshold). In one example, the design data space positions of the output may be determined as described herein. The design data space positions may be used to determine one or more characteristics of the design for the specimen at the design data space positions of the output. For example, the design data space positions may be used to determine the type of features that are formed at the locations on the specimen at which the output was generated. Information about those types of features may then be used to determine the one or more defect detection parameters on a position-to-position basis. In this manner, since the design data space positions of the output can be determined as described herein with substantially high accuracy, the parameter(s) used for detecting defects can be adjusted on a position-to-position basis with substantially high accuracy thereby providing defect detection sensitivity that can be altered based on the changes in the characteristics of the design at different positions on the specimen. In one such example, sub-pixel PDA such as that described herein can enable critical use cases such as sensitivity for 1× design rules. In this manner, the sensitivity of the defect detection can be adjusted depending on whether the different positions on the specimen are located at potential defect of interest (DOI) locations in the design.

In another embodiment, the computer subsystem(s) are configured for detecting defects on the specimen based on the output generated at the other positions and determining design data space positions of the defects based on the design data space positions of the output generated at the other positions. Detecting defects on the specimen may be performed as described further herein. Determining the design data space positions of the defects may include determining design data space positions of the output corresponding to the defects and assigning those design data space positions to the defects. Therefore, since the embodiments described herein can determine the design data space positions of the output with substantially high accuracy, the defect location accuracy will be substantially high. In this manner, the positions of the detected defects can be determined in design data space, which enables determining information about the portion of the design in which the defects are located much easier and more accurate. Therefore, the embodiments described herein can be used to determine information about the design for the design data space defect positions with substantially high accuracy. As such, the embodiments described herein can be used to provide inspection results that are more relevant to the design for the specimen than other currently used systems and methods.

In another embodiment, the computer subsystem(s) are configured for detecting defects on the specimen based on the output generated at the other positions, determining design data space positions of the defects based on the design data space positions of the output generated at the other positions, and binning the defects based on their design data space positions. Detecting the defects on the specimen and determining the design data space positions of the defects may be performed as described further herein. Binning the defects based on their design data space positions may be performed in any suitable manner. For example, the design data space positions of different defects may be compared. Those defects that were detected at substantially the same design data space positions may be binned into one group. In this manner, each group may include only defects detected at the same or substantially the same design data space positions while different groups may include defects detected at different design space positions. In addition, the design data space positions of the defects determined as described herein may be used to group defects based on which pattern in the design that the defects are located in, on, or near. For example, the design data space positions may be used to determine information about the device patterns nearest to each of the defects. Those defects whose nearest patterns are the same or substantially the same can then be binned into the same group. In this manner, each group may include only defects detected closest to the same or substantially the same device patterns while different groups may include defects detected nearest to different device patterns. As such, sub-pixel PDA such as that described herein can enable critical use cases such as defect binning for 1× design rules.

Additional embodiments described herein relate to generating and/or using a novel database approach for improved PDA performance. In general, PDA may be performed for every inspection that uses design-based care areas. As described further herein, PDA methods generally match images from a specimen to the corresponding design (e.g., design clips). Design clips for a set of "good" alignment targets on a specimen may be extracted and rendered to look like the specimen image and then using various image processing techniques, the rendered images may be matched to the alignment target image from the specimen to perform fine alignment.

One drawback of such approaches is that the comparison is performed with the specimen image but the specimen image quality (e.g., resolution, etc.) can degrade quickly as the design rules shrink below 10 nm. In addition, currently, design clips are selected based on what will be visible in the specimen image. However, users do not necessarily know what structures on which layers of the specimen will be visible upfront. As a result, a user may put a lot of design information (and possibly for multiple layers of the specimen) in a reticle design file (RDF) because he/she is not sure which design structures will work for PDA. Furthermore, in a given fab, multiple devices may be fabricated at the same design rules, and for any particular device, PDA may need to be set up for at least 20 or more layers. Therefore, if there are "n" number of devices at a given design rule, a user may need to do PDA setup on 20*n recipes. Any performance improvement in the setup of the PDA recipes would therefore certainly help improve the productivity of the user.

The embodiments described herein can improve on such currently used setup methods by consolidating the PDA learning into a database and feeding forward this information on RDF creation when PDA is being setup for a new device for the same design rule. For example, any given design/IC layout is typically a collection of standard cells and custom cells. The purpose of the standard cell library is to promote pattern reuse across the whole layout. The same standard cell library may be used by multiple chips. Given this fact, it is expected that similar looking structures may be present on the same design rule specimens even though they are being used to form different devices.

In one embodiment, the computer subsystem(s) are configured for generating a data structure containing information for the selected alignment targets and storing the data structure in a non-transitory computer-readable storage medium. Such generation of the infrastructure may be performed during PDA setup after a user learns of a good PDA score. For example, once alignment targets have been selected, information for the selected alignment targets may be used to create a data structure such as a database that is stored in a storage medium such as one of those described herein. In this manner, the information for the selected alignment targets (i.e., the "good" alignment targets) determined for one specimen can be reused for another specimen. In some instances, the computer subsystem(s) may generate a new data structure when the alignment targets are the first that are being selected for a given design rule and process layer combination. However, in other instances in which an existing data structure of "good" alignment target information is available for a given design rule and process layer combination, the computer subsystem(s) may store only the information for the "good" alignment targets that is not already in the data structure. In this manner, generating the data structure performed by the computer subsystem(s) may include updating an existing data structure for a given design rule and process layer. For example, in one embodiment, the computer subsystem(s) are configured for storing information for the selected alignment targets to a non-transitory computer-readable storage medium containing information for other alignment targets selected for other specimens.

In general, the computer subsystem(s) will store only information for alignment targets not already stored in the data structure. In particular, there is no need to create duplicate stored information for the same "good" alignment targets since the database can include the cumulative learning generated by PDA setup and performed on multiple different specimens of the same design rule and process layer, which can be shared with the PDA setup process performed for still other specimens of the same design rule and process layer. For example, in one such embodiment, the computer subsystem(s) are configured for modifying a data structure that includes other information for other alignment targets such that the modified data structure includes information for the selected alignment targets, and the other alignment targets were selected for only other specimens of the same layer and design rule as the specimen. In this manner, the data structure may be specific to only one layer and design rule combination. In addition, different data structures may be created, modified, and maintained for different layer and design rule combinations. The computer subsystem(s) may be configured to modify the data structure in any suitable manner (e.g., by adding information into the existing data structure and storing the modified data structure and/or creating a new version of the data structure that includes the information for the newly selected alignment targets). In this manner, the embodiments described herein may be configured for providing an infrastructure to consolidate a database of all working PDA target design clips, images (optical or electron beam), etc. for a design rule/process layer combination. Such generation of the infrastructure may be performed during PDA setup after a user learns of a good PDA score.

In a further embodiment, selecting the alignment targets includes comparing different portions of the design for the specimen to other alignment targets that were selected for only other specimens of the same layer and design rule as the specimen and identifying one or more of the different portions that match one or more of the other alignment targets as at least one of the selected alignment targets. For example, design data such as an OASIS or GDS file or another type of design data described herein may be obtained. Layermapping data for the design may also be obtained. The computer subsystem(s) may then determine if PDA targets are available in a PDA target database for the layer. For example, the computer subsystem(s) may compare the alignment targets that were previously selected to different portions of the design and select the portions of the design that match or substantially match one or more of the alignment targets that were previously selected as PDA targets for the specimen for which inspection is currently being setup. In one such example, once the targets that are applicable for a given layer have been acquired (from a data structure generated and/or modified as described herein), a pattern search can be performed on the RDF for the specimen for which inspection is being set up, in which all locations that contain similar targets are searched for.

In some embodiments, selecting the alignment targets includes identifying other alignment targets that were selected for only other specimens of the same layer and design rule as the specimen, selecting one or more of the other alignment targets for use as the alignment targets, and adding the one or more of the other alignment targets to the design for the specimen. For example, during RDF generation, the computer subsystem(s) may look up a database such as one of those generated and/or modified as described herein and automatically create PDA targets in a design of a separate layer for each process step. In this manner, the computer subsystem(s) may add PDA targets to a PDA RDF and create an RDF with the PDA RDF. The created RDF may then be transferred to an inspection tool and/or any other suitable tool, which may use the created RDF for RDA and any other suitable functions.

In another embodiment, the computer subsystem(s) are configured for generating a version of the design that includes only portions of the design corresponding to each of the alignment targets and not other portions of the design that do not correspond to any of the alignment targets. For example, as described further herein, the potential PDA pass locations can be determined be the computer subsystem(s) even before PDA setup. Therefore, the design data can be pruned to ensure that only the required subset of design data for PDA and not the entire design polygons for the layer is included in the design data. In addition, when a pattern search is performed on an RDF based on the targets that are known to be useful for PDA for a given layer, all of the matching locations may be extracted and a PDA RDF may be generated. As much, the PDA RDF may be derived from the existing PDA target database. In this manner, the PDA RDF will have a smaller footprint compared to the original RDF. The PDA RDF may be contained within the original RDF. As a fallback mechanism, the original RDF may be maintained in case the PDA RDF does not work.

When a PDA RDF is being used in an inspection flow, the computer subsystem(s) may setup a design-based care area inspection recipe. The computer subsystem(s) may then select the RDF and align. The computer subsystem(s) may then determine if the PDA RDF is available. If the PDA RDF is available, the computer subsystem(s) may get the targets from the PDA RDF. If the PDA RDF is not available, the computer subsystem(s) may use the normal RDF and try PDA. When the computer subsystem(s) get the targets from the PDA RDF, the computer subsystem(s) may then determine if the PDA is successful. If the PDA is not successful, the computer subsystem(s) may use the normal RDF and try PDA. When the PDA is determined to be successful, the computer subsystem(s) may save the PDA results and run the inspection recipe. The computer subsystem(s) may also save the PDA targets to a database as described further herein.

The embodiments described herein may therefore have a number of advantages over other methods and systems for PDA. For example, currently, whatever is learned in PDA for a specimen is specific to the PDA database for that specimen and the set of recipes linked to the PDA database. There is not currently any consolidated repository for all working PDA alignment targets. Consolidating this information will help to automate and improve dataflow for some of the time intensive/process intensive steps in inspection recipe setup. In addition, the embodiments described herein can be provided as a new feature to existing design-based care area inspection features. Furthermore, any improvement to PDA setup and learning will result in a better PDA experience for users. Moreover, ensuring that PDA will pass with a relatively good score reduces recipe setup time.

Another embodiment relates to a computer-implemented method for determining a position of output generated by an inspection subsystem in design data space. The method includes steps for each of the functions of the computer subsystem(s) described above. The inspection subsystem is configured as described herein.

Each of the steps of the method may be performed as described further herein. The method may also include any other step(s) that can be performed by the inspection subsystem and/or computer subsystem(s) or system(s) described herein. The steps of the method are performed by one or more computer systems, which may be configured according to any of the embodiments described herein. In addition, the method described above may be performed by any of the system embodiments described herein.

Figure 10:
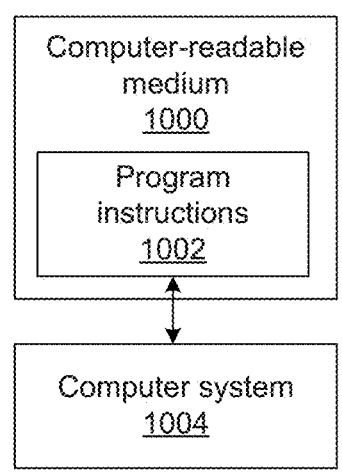
FIG. 10 is a block diagram illustrating one embodiment of a non-transitory computer-readable medium storing program instructions executable on a computer system for performing one or more of the computer-implemented methods described herein.

An additional embodiment relates to a non-transitory computer-readable medium storing program instructions executable on a computer system for performing a computer-implemented method for determining a position of output generated by an inspection subsystem in design data space. One such embodiment is shown in FIG. 10. In particular, as shown in FIG. 10, non-transitory computer-readable medium 1000 includes program instructions 1002 executable on computer system 1004. The computer-implemented method may include any step(s) of any method(s) described herein.

Program instructions 1002 implementing methods such as those described herein may be stored on computer-readable medium 1000. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system 1004 may be configured according to any of the embodiments described herein.

All of the methods described herein may include storing results of one or more steps of the method embodiments in a computer-readable storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc.

Further modifications and alternative embodiments of various aspects of the invention will be apparent to those skilled in the art in view of this description. For example, methods and systems for determining a position of output generated by an inspection subsystem in design data space are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to determine a position of output generated by an inspection subsystem in design data space, comprising:
    an inspection subsystem comprising at least an energy source and a detector, wherein the energy source is configured to generate energy that is directed to a specimen, wherein the detector is configured to detect energy from the specimen and to generate output responsive to the detected energy, and wherein the output comprises frames of the output; and
    one or more computer subsystems configured for:
        selecting alignment targets for the specimen such that one or more of the alignment targets appear in each of the frames generated by the inspection subsystem for the specimen;
        aligning one or more images for each of the alignment targets to its corresponding portion of a design for the specimen;
        determining an offset between the output and the design for each zone of the output based on results of aligning the one or more images generated for one or more of the alignment targets located therein, wherein each zone comprises one or more of the frames;
        aligning output generated by the inspection subsystem at each position of each of the alignment targets on the specimen to the one or more images for the alignment targets;

determining, for each alignment target, an additional offset between the output generated at its corresponding position on the specimen and its corresponding one or more images based on results of aligning the output; and determining, for each of the frames, design data space positions of output generated by the inspection subsystem at other positions on the specimen located therein based on the offset determined for its corresponding zone, the additional offset determined for each of the alignment targets located therein, and specimen space positions of the output generated at the other positions located therein.

2. The system of claim 1, wherein each zone further comprises 10 or fewer of the frames.

3. The system of claim 1, wherein the design data space positions of the output are determined with sub-pixel accuracy.

4. The system of claim 1, wherein the alignment targets comprise one or more subpixel patterns.

5. The system of claim 1, wherein selecting the alignment targets comprises selecting the alignment targets at a spatial frequency across the specimen that is higher than or equal to a frequency that causes deformation of images generated from the output of the inspection subsystem.

6. The system of claim 1, wherein the one or more computer subsystems are further configured for generating the design used for aligning the one or more images by separately modifying different portions of the design corresponding to each of the frames based on deformation of images generated for the specimen from the output of the inspection subsystem.

7. The system of claim 1, wherein the one or more computer subsystems are further configured for generating one or more simulated images illustrating how different portions of the design will appear in images generated by the inspection subsystem, and wherein said aligning the one or more images comprises aligning the one or more images to the one or more simulated images.

8. The system of claim 1, wherein determining the design data space positions comprises:

determining, for each of the frames, one or more further offsets between the output generated by the inspection subsystem at the other positions on the specimen located therein and its corresponding portion of the design based on the offset determined for its corresponding zone and the additional offset determined for each of the alignment targets located therein; and determining the design data space positions based on the one or more further offsets and the specimen space positions of the output generated at the other positions located therein.

9. The system of claim 1, wherein the one or more computer subsystems are further configured for detecting defects on the specimen based on the output generated at the other positions and determining one or more parameters used for said detecting based on the design data space positions of the output generated at the other positions.

10. The system of claim 1, wherein the one or more computer subsystems are further configured for detecting defects on the specimen based on the output generated at the other positions and determining design data space positions of the defects based on the design data space positions of the output generated at the other positions.

11. The system of claim 1, wherein the one or more computer subsystems are further configured for detecting defects on the specimen based on the output generated at the other positions, determining design data space positions of the defects based on the design data space positions of the output generated at the other positions, and binning the defects based on their design data space positions.

12. The system of claim 1, wherein the one or more computer subsystems are further configured for storing information for the selected alignment targets to a non-transitory computer-readable storage medium containing information for other alignment targets selected for other specimens.

13. The system of claim 1, wherein the one or more computer subsystems are further configured for generating a data structure containing information for the selected alignment targets and storing the data structure in a non-transitory computer-readable storage medium.

14. The system of claim 1, wherein the one or more computer subsystems are further configured for modifying a data structure comprising other information for other alignment targets such that the modified data structure comprises information for the selected alignment targets, and wherein the other alignment targets were selected for only other specimens of the same layer and design rule as the specimen.

15. The system of claim 1, wherein selecting the alignment targets comprises comparing different portions of the design for the specimen to other alignment targets that were selected for only other specimens of the same layer and design rule as the specimen and identifying one or more of the different portions that match one or more of the other alignment targets as at least one of the selected alignment targets.

16. The system of claim 1, wherein selecting the alignment targets comprises identifying other alignment targets that were selected for only other specimens of the same layer and design rule as the specimen, selecting one or more of the other alignment targets for use as the alignment targets, and adding the one or more of the other alignment targets to the design for the specimen.

17. The system of claim 1, wherein the one or more computer subsystems are further configured for generating a version of the design that comprises only portions of the design corresponding to each of the alignment targets and not other portions of the design that do not correspond to any of the alignment targets.

18. The system of claim 1, wherein the specimen comprises a wafer.

19. The system of claim 1, wherein the energy directed to the specimen comprises light, and wherein the energy detected from the specimen comprises light.

20. The system of claim 1, wherein the energy directed to the specimen comprises electrons, and wherein the energy detected from the specimen comprises electrons.

21. A non-transitory computer-readable medium, storing program instructions executable on a computer system for performing a computer-implemented method for determining a position of output generated by an inspection subsystem in design data space, wherein the computer-implemented method comprises:

selecting alignment targets for a specimen such that one or more of the alignment targets appear in each of frames of output generated by an inspection subsystem for the specimen, wherein the inspection subsystem comprises at least an energy source and a detector, wherein the energy source is configured to generate energy that is directed to the specimen, and wherein the detector is configured to detect energy from the specimen and to generate the output responsive to the detected energy;

aligning one or more images for each of the alignment targets to its corresponding portion of a design for the specimen;

determining an offset between the output and the design for each zone of the output based on results of aligning the one or more images generated for one or more of the alignment targets located therein, wherein each zone comprises one or more of the frames;

aligning output generated by the inspection subsystem at each position of each of the alignment targets on the specimen to the one or more images for the alignment targets;

determining, for each alignment target, an additional offset between the output generated at its corresponding position on the specimen and its corresponding one or more images based on results of aligning the output; and determining, for each of the frames, design data space positions of output generated by the inspection subsystem at other positions on the specimen located therein based on the offset determined for its corresponding zone, the additional offset determined for each of the alignment targets located therein, and specimen space positions of the output generated at the other positions located therein, wherein selecting the alignment targets, aligning the one or more images, determining the offset, aligning the output, determining the additional offset, and determining the design data space positions are performed by one or more computer subsystems.

22. A computer-implemented method for determining a position of output generated by an inspection subsystem in design data space, comprising:

selecting alignment targets for a specimen such that one or more of the alignment targets appear in each of frames of output generated by an inspection subsystem for the specimen, wherein the inspection subsystem comprises at least an energy source and a detector, wherein the energy source is configured to generate energy that is directed to the specimen, and wherein the detector is configured to detect energy from the specimen and to generate the output responsive to the detected energy;

aligning one or more images for each of the alignment targets to its corresponding portion of a design for the specimen;

determining an offset between the output and the design for each zone of the output based on results of aligning the one or more images generated for one or more of the alignment targets located therein, wherein each zone comprises one or more of the frames;

aligning output generated by the inspection subsystem at each position of each of the alignment targets on the specimen to the one or more images for the alignment targets;

determining, for each alignment target, an additional offset between the output generated at its corresponding position on the specimen and its corresponding one or more images based on results of aligning the output; and determining, for each of the frames, design data space positions of output generated by the inspection subsystem at other positions on the specimen located therein based on the offset determined for its corresponding zone, the additional offset determined for each of the alignment targets located therein, and specimen space positions of the output generated at the other positions located therein, wherein selecting the alignment targets, aligning the one or more images, determining the offset, aligning the output, determining the additional offset, and determining the design data space positions are performed by one or more computer subsystems.

* * * * *